Sept. 1, 1964 F. B. PERRI ETAL 3,146,908
VENDING MACHINE HAVING A PLURALITY OF DISPENSING COMPARTMENTS
Filed March 29, 1960 6 Sheets-Sheet 1

FIG. 1

INVENTORS
Francis C. DuGrenier
BY Frank B. Perri

Porter, Chittick & Russell
ATTORNEYS

FIG. 3

Sept. 1, 1964 F. B. PERRI ETAL 3,146,908
VENDING MACHINE HAVING A PLURALITY OF DISPENSING COMPARTMENTS
Filed March 29, 1960 6 Sheets-Sheet 4

FIG. 4

INVENTORS
Francis C. DuGrenier
Frank B. Perri
BY
Porter, Chittich & Russell
ATTORNEYS

FIG. 5

INVENTORS
Francis C. DuGrenier
Frank B. Perri
BY
Porter, Chittick & Russell
ATTORNEYS

United States Patent Office 3,146,908
Patented Sept. 1, 1964

3,146,908
VENDING MACHINE HAVING A PLURALITY OF DISPENSING COMPARTMENTS
Frank B. Perri, 107 School St., Groveland, Mass., and Francis C. Du Grenier, Bradford, Mass.; said Du Grenier assignor to The Seeburg Corporation, Chicago, Ill., a corporation of Delaware
Filed Mar. 29, 1960, Ser. No. 18,422
5 Claims. (Cl. 221—124)

This invention relates to vending machines and more particularly to a new and improved mechanically operated, coin controlled vending machine having a front row of storage compartments and a rear row of storage compartments with means on the front of the machine for selectively ejecting articles from the front and rear storage compartments.

Heretofore it has been deemed desirable to increase the capacity of conventional cigarette machines so as to permit them to vend a greater variety of cigarettes. With the advent of greater popularity of filter and mentholated cigarettes, this desire has turned to a crucial need. However, because of certain practical considerations, it has been recognized that greater capacity cannot be obtained simply by building machines of greater width. Because of this limitation, it has been deemed obvious that the answer is to provide a machine having both front and rear storage compartments with means for dispensing from any selected compartment. Although the concept of a vending machine with both front and rear storage compartments is old, heretofore there has not been available in all-mechanical vending machines which is satisfactory to the servicing or merchandising companies which keep the machines filled with merchandise. Electrically operated vending machines having both front and rear storage compartments have been available for some time; but because of the complexity of the electrical circuitry involved, the industry has still desired an all-mechanical vending machine having equivalent storage capacity.

Fully mechanical front and rear storage vending machines heretofore available have had many disadvantages, and one of these has been the location of the operating handles. These have been just above the delivery chute, at the same level as the bottom ends of the storage compartments, or just below. This is awkward; and for this reason, electric vending machines have had more appeal since several electric vending machines have been made which have operating buttons located adjacent the top of the machine at waist level or higher so that the customer can more readily determine which type of merchandise will be vended when a particular button is selected for operation. Having the operating handles at the bottom of the storage compartments results in a further disadvantage—the ejector mechanisms for the different compartments are not readily accessible and removal of jammed packages sometimes proves to be a substantial problem. Other disadvantages are readily known to persons skilled in the art, these disadvantages varying from machine to machine.

The primary object of this invention is to provide an all-mechanical vending machine having front and rear storage compartments, all of which are readily accessible for replenishment of merchandise, and ejector mechanisms for the several compartments which are readily accessible and which are controlled by operating handles located at the top of the storage compartments.

Another object of this invention is to provide a vending machine having novel means for ejecting articles from its storage compartments, the novel ejector means being individually detachable without disassembly of the operating mechanism therefor.

A further object of the invention is to provide a mechanical vending machine having a front row of storage compartments and a rear row of storage compartments, the compartments in the front row each having individually operated ejector mechanisms which are mounted adjacent the front of the machine and the compartments in the rear row likewise having individually operated ejector mechanisms which are located at the back of the machine, all of these mechanisms being operated by handles which are mounted above the storage compartments and which project from the front of the machine.

Still another object of this invention is to provide a vending machine having a front row of storage compartments and a rear row of storage compartments, each compartment having its own ejector mechanism, and manually operated means being mounted on a horizontal frame which is mounted above the storage compartments, the horizontal frame being pivotally secured to the machine whereby it may be lifted up away from the storage compartments so as to disconnect the operating mechanisms from the ejector mechanisms.

Another specific object is to provide a vending machine having a series of front storage compartments and a series of rear storage compartments, each compartment having its own ejector mechanism, the front storage compartments being attached to a frame which is pivotally secured to side wall members of the machine, whereby the front compartments may be swung forwardly away from the rear compartments to facilitate loading of the latter.

It is also an object of this invention to provide a vending machine comprising a case having side walls, a rear wall, a bottom wall, a front wall whose top edge terminates below the top edge of the rear wall, said front wall having an opening through which vended articles may be discharged from the machine, a door hinged to the top of said front wall, a cover pivoted to said rear wall, an operating mechanism for said vending machine attached to the underside of said cover, said operating mechanism including a plurality of operating handles each of which is associated with a separate storage compartment within said machine, said door having means at its top end interlocking with a tongue carried by said cover, whereby said cover may be lifted only after said front door has been swung open, and means carried by said door and engageable with means carried by said side walls for locking said door in closed position.

Other objects and many of the attendant advantages of this invention will be readily appreciated as the invention becomes better understood by reference to the following detailed description when considered in connection with the accompanying drawings, wherein.

Figure 1:
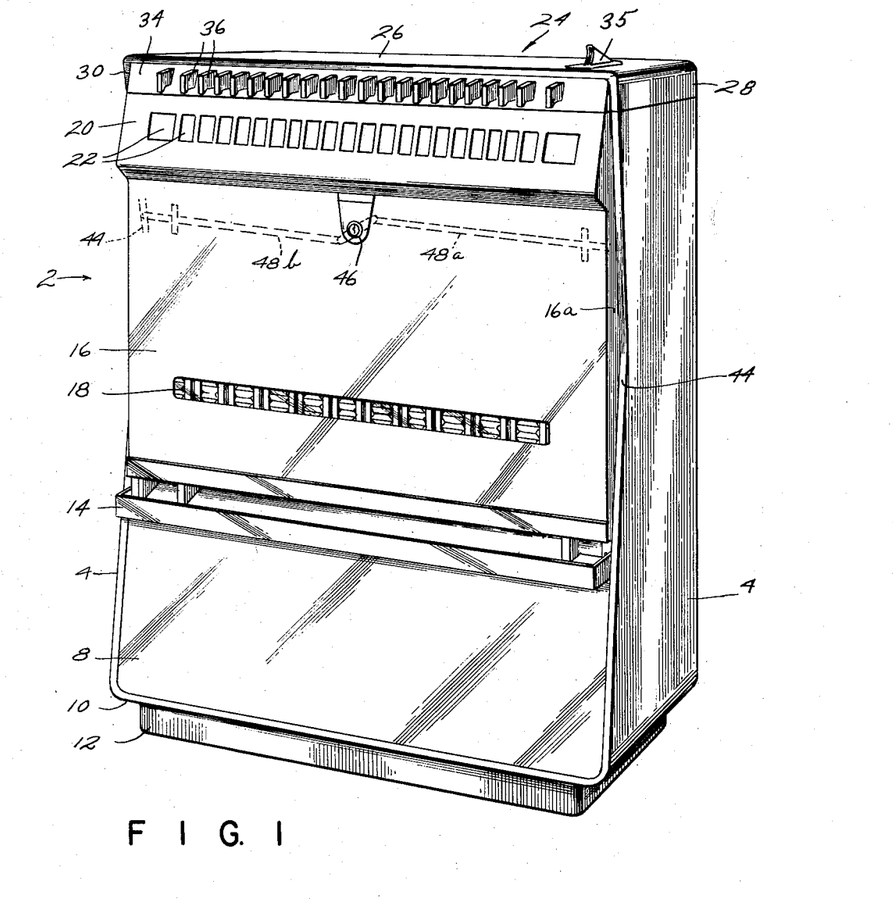
FIG. 1 is a perspective view of a vending machine embodying the present invention.
Figure 2:
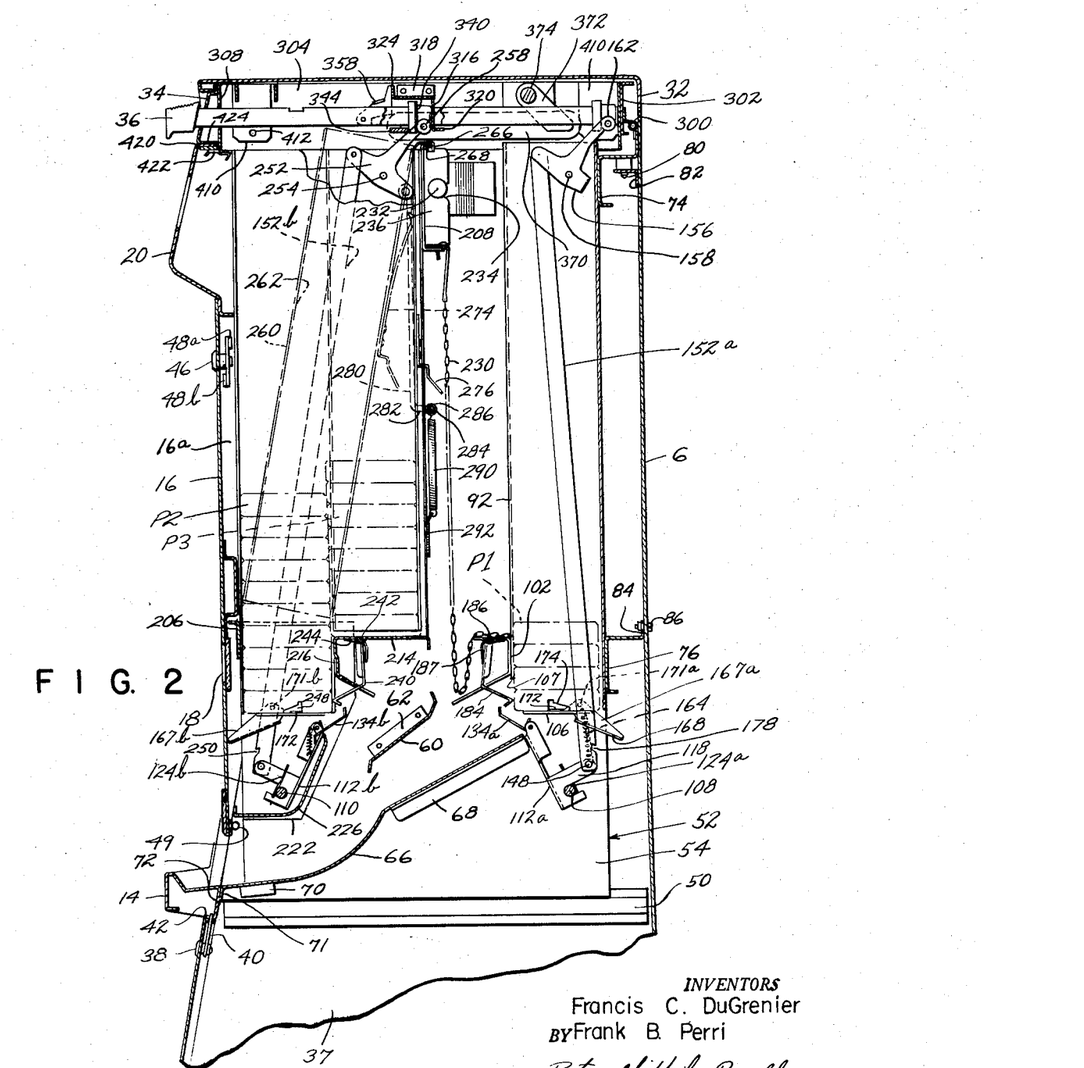
FIG. 2 is a sectional view in elevation taken along line 2—2 of FIG. 5 referred to hereinafter.

Referring now to FIG. 1, there is shown a vending machine case generally identified by the number 2 which comprises two opposite side walls 4, a rear wall 6 (FIG.

2), a front wall 8, a bottom wall 10 which rests on a pedestal 12, a delivery chute tray 14 welded in place immediately above the front wall 8, a front door 16 having (a) an elongated window 18 to permit inspection of the supply of articles to be vended in the storage compartments and (b) an inclined display panel 20 with a plurality of small windows 22 and a cover 24. Cover 24 comprises a top wall 26, side walls 28 and 30, and a rear wall 32. Rear wall 32 is illustrated in FIG. 2. Supported by the cover 24 is an operating handle assembly which includes a front panel 34 out of which project a series of operating handles 36. The windows or apertures 22 equal in number the operating handles 36 and are disposed immediately below these handles. It is to be understood that printed cards identifying the function of each handle are located behind apertures 22 so that the purchaser may readily discern what will happen or what article or brand of article he will secure when a particular operating handle is actuated. A coin insert casting 35 is attached to cover 24 in position to direct coins into a coin processing system (not shown) which unlocks the machine for operation only when the coins equal or exceed a minimum amount.

In practice, the leftmost aperture 22 in FIG. 1 displays a card bearing the legend "Matches" to indicate the function of the handle 36 located directly above it. Similarly, the rightmost aperture 22 displays the legend "Coin Return" to indicate the function of the rightmost handle. The intermediate apertures are to display cards identifying the brand of cigarettes which are dispensed by the handles located directly above those apertures.

The front wall 8 may be fixed so as not to be removable. Alternatively and preferably, the front wall 8 is hinged at the bottom to the bottom wall 10 so as to form a compartment 37 for the storage of extra merchandise. In the latter situation, a lock 38 will be provided as shown in FIG. 2 so as to permit the panel 8 to be locked in place. Preferably, the lock 38 is key operated and includes a tongue 40 which is movable into or out of an appropriate slot formed in a lip 42 which is integral with the delivery tray 14. When the tongue 40 is positioned within the slot 42, the front panel 8 will be locked. When the tongue 40 is removed from the slot 42 by operation of a key inserted in lock 38, the panel is unlocked and spare merchandise may be introduced to or removed from the storage compartment.

It is to be noted that side walls 4 are formed with inturned flanges 44 and that the front door 16 is fitted with a key-operated lock 46 which toggle operates a pair of bars 48a and 48b which are movable behind flanges 44 to lock the door in closed position. Of course, since door 16 has side flanges 16a which slide inside of side walls 4, it is necessary to provide suitable slots (not shown) in flanges 16a in order to allow bars 48a and 48b to project therethrough behind flanges 44. Door 16 may not be opened until the bars are withdrawn from behind flanges 44 by operation of lock 46. Door 16 is hinged at its bottom end to a rod 49 (FIG. 2) which is welded to side walls 4 or the case. Since this hinged connection is on the inside face of the door, it cannot be tampered with so long as the door is closed.

The side walls 4 and 6 of the housing are provided with horizontal U-shaped bars 50 which are located at the same level. These function as ledges to support the operating assembly which includes the ejectors and the storage mechanism. This operating assembly is indicated generally at 52 in FIGS. 2 and 3. This assembly includes two side walls 54 and 56 shown in FIGS. 2 and 3 respectively which sit on the ledges formed by the bars 50. These side walls 54 and 56 are held in parallel-spaced relation by a plurality of transversely extending members. These transversely extending members include a package-deflecting member 60 having upturned flanges 62 at its ends which are welded to the two side walls 54 and 56. Another one of these transversely extending members is a chute 66 which has two flanges 68 and 70 at each end which also are welded to the two side walls. Chute 66 is located below deflecting member 60 and is so located as to receive articles ejected from both the front and rear storage compartments referred to hereinafter. At its front end, chute 66 has a depending flange 71 which is slanted to fit snugly against the rear wall 72 on delivery tray 14. Chute 66 is curved and positioned so as to be flush with the rear edge of tray 14. Two additional cross members 74 and 76 are welded to outwardly projecting flanges 78 which are formed at the rear edges of the two side walls 54 and 56. In addition to holding together the two side walls, the two cross members 74 and 76 function to locate the assembly within the housing. The upper rear cross member 74 carries two downwardly projecting pins 80, one at each end of the cross member. These pins 80 are so located as to fit within openings formed in brackets 82 which are attached to the rear wall 6 of the housing. When the assembly is inserted in the housing, it is necessary to lift it sufficiently high so as to allow the pins to clear the brackets 82 and fall into the holes therein. The bottom cross member 76 has an upwardly extending flange 84 which lies against the rear wall of the housing when the assembly is properly located. Flange 84 has several tapped holes to receive screws 86 which secure it to rear wall 6 so as to prevent the assembly from shifting laterally so as to be dislodged from one or the other of the ledges formed by the bars 50. Disposed between the two side walls 54 and 56 adjacent their rear edges is a plurality of pairs of parallel partitions 90 and 92, with each pair of partitions forming a separate rear storage compartment RC. Partitions 90 have inturned flanges 94 and 96, and partitions 92 have inturned flanges 98 and 100. The rear flanges 94 and 98 are welded to cross members 74 and 76. The forward flanges 96 and 100 are welded to a transversely extending angle member 102 (FIG. 2) which is more particularly described hereinafter. The members 90 and 92 are fixed and do not move at all. At their bottom ends, the members 90 and 92 are provided with horizontal flanges 104 and 106. These flanges act to support a column of cigarettes disposed in the compartments RC. In this connection, it is to be noted that the flanges 94 and 98 prevent removal of articles from the rear side of the compartments RC and that flanges 96 and 100 prevent removal of articles from the front side of compartments RC except below flanges 96 and 100 which terminate at 107 above flanges 104 and 106 a distance less than the thickness of two articles but greater than the thickness of one article.

Located below the compartments RC is a shaft 108 whose ends are anchored in the side walls 54 and 56. A like rod 110 is mounted in the two side walls 54 and 56 adjacent their front edges. These rods or shafts 108 and 110 rotatably support ejector elements. The ejector elements mounted on shaft 108 are identical to the ejector elements mounted on shaft 110; but for purposes of distinguishing between them, the rear ones are identified by the numeral 112a and the front ones are designated by the designation 112b. Since they are identical, a description of one will suffice as a description of all of them.

Figure 6:
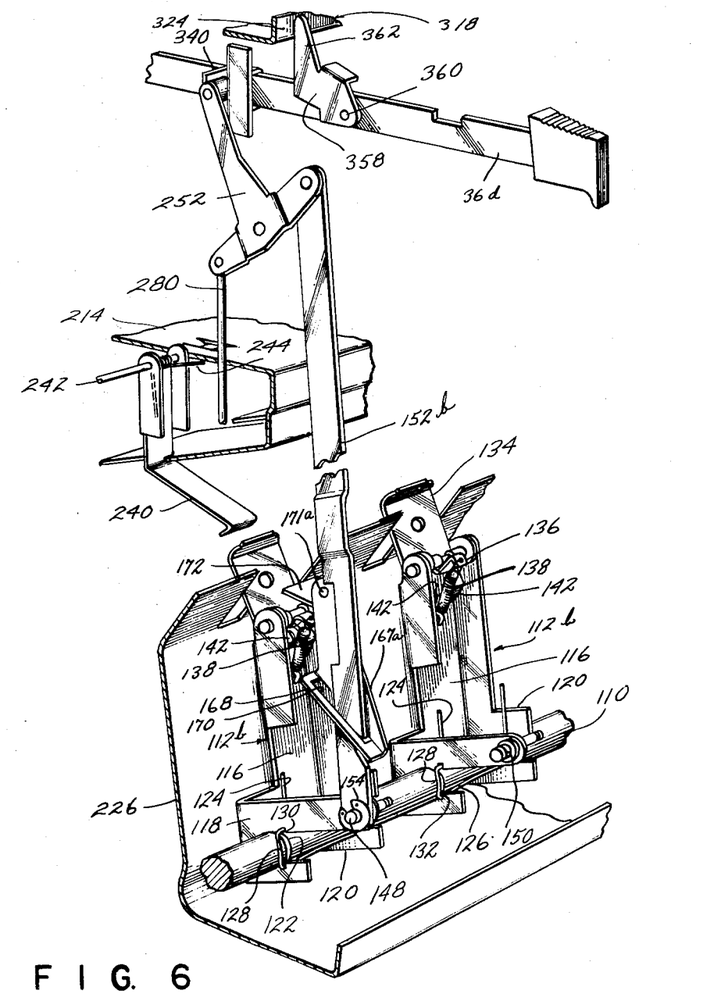
FIG. 6 is a perspective view of one of the operating handles and the mechanism operated thereby for actuating one of the ejector assemblies.

Turning for the moment to FIG. 6, there is illustrated a portion of shaft 110 and a pair of ejector elements 112b mounted thereon. These ejector elements comprise an upstanding body portion 116 having at its bottom ends two lateral extensions 118 and 120 which are bifurcated so as to fit onto shaft 110. Shaft 110, and shaft 108 as well, is provided with a series of peripheral grooves 122 to accommodate the bifurcated extensions 118 and 120. These extensions fit in grooves 122 and are prevented thereby from moving axially along the shaft. A specially designed U-shaped spring member 124 is snapped in place between the two extensions 118 and 120 so as to rotatably retain the ejector element on the shaft. In FIG. 2, the spring member for ejectors 112a are identified as 124a, and the spring members for ejectors 112b are identified as 124b. It is to be noted that these spring members include a portion 126 which extends along parallel to the shaft on which the ejectors are mounted and two parallel portions 128 which are tangent to the exterior surface of the shaft. It is these portions 128 which prevent the ejector members from falling off the shafts. Notches 130 and 132 are provided in each of the extensions 118 and 120 so as to retain the spring members 124.

Pivotally attached to the upper part of body portion 116 of each ejector member is a deflectable tongue 134. Tongues 134 have short extensions 136, each of which is connected to one end of a coil tension spring 138. The opposite end of each coil spring 138 is anchored to the body portion 116 of the ejector member. Tension springs 138 oppose pivoting of the tongues 134 in a counterclockwise direction as viewed in FIG. 6. However, the tongues 134 are limited in the extent that they can be pulled clockwise by springs 138. They are limited by extensions 142 which act as stop elements against the body portions 116.

The arms or extensions 118 of the ejector members are provided with laterally extending pivot pins 148. These pins are provided with peripheral grooves 150. Attached to the pivot pins 148 of the rear ejectors 112b are levers 152a. Identical levers 152b are attached to the front ejectors 112b. These levers are secured in place by means of C-rings 154 which are slipped into the peripheral grooves 150. The use of C-rings makes it easy to disassemble the levers 152 from the ejector members 112. The levers 152a extend up between adjacent partitions 90 and 92 of adjacent compartments RC. These levers 152a are pivotally secured at their upper ends to corresponding arms on a plurality of L-shaped cranks 156. These L-shaped cranks, with the exception of the one which is nearest the side panel 56, are pivotally connected by screws 158 to panels 90 and 92. The excepted crank 156a (see FIG. 5) is pivotally secured by a screw 158a only to the adjacent partition 92. Spacer means 160 are employed to space the crank 156a from the adjacent partition 92. The cranks 156 all carry a roller 162 at their upper ends. The upper ends of these cranks extend above the partitions 90 and 92, as shown in FIG. 2.

When the cranks 156 are rotated counterclockwise (as viewed in FIG. 2), the levers 152a exert a downward thrust on the arms 118, thereby causing them to rotate clockwise. This causes the ejectors 112a to move underneath the columns P1 of cigarettes supported within the compartments RC directly above the ejectors. As each ejector moves under the column of cigarettes directly above it, its tongue 134a will yield in a counterclockwise direction and will assume a horizontal position as the ejector continues under the bottommost pack. As soon as the ejector has pivoted clockwise sufficiently to carry the end of the tongue 134a beyond the column of cigarettes, its spring 138 will immediately cause the tongue to rotate clockwise back to its normal position. In other words, the tongue 134 will rotate to the extent permitted by stops 142. Thereafter, when the ejector is rotated counterclockwise again by opposite movement of crank 156 and lever 152a, the tongue will engage the rear end of the bottom pack in column P1. As the ejector continues to rotate back to its original position, the tongue 134 will force the bottom pack out from the column P1 and down onto the chute 68. If it is ejected with greater than normal force, the pack will hit the deflecting member 60 and will be directed by the latter onto the chute 66. The pack will then slide down the chute 66 and come out onto the tray 14, from whence it can be retrieved by the customer.

In order to assist the ejectors 112a to return to their normal position, a spring 164 is connected between each pin 148 and the flange 106 which is directly above the ejector in question. In this connection, it is to be noted that each flange 106 is provided with a small hole (not visible in the drawings) to receive the end of the tension spring 164. The bottom ends of the tension springs 164 are connected to pins 148 at the ends opposite the ends carrying the C-rings 154.

In order to prevent operation of a particular ejector 112a when the compartment above it is exhausted of cigarette packs, each partition 92 is provided with a locking member 167. Since identical locking members are associated with the front compartments, the locking members for the rear compartments are identified as 167a and the locking elements for the front compartments are identified as 167b. As illustrated in FIG. 6, locking elements 167a and 167b are made of flat stock and are formed with a side flange 168 which is slotted as at 170 to receive the levers 152. Locking elements 167a are pivotally secured by pivot pins 171a to partitions 92. Locking elements 167b are secured by pivot pins 171b to corresponding partitions 200 of front compartments FC. Adjacent their top ends, these locking elements have another side flange 172 which extends in the direction opposite from flanges 168. Locking elements 167a are disposed on the outside of the panels 92, and the latter are formed with slots 174 through which the flanges 172 can extend into compartments RC. Flanges 172 of locking elements 167a actually overlie the article-supporting flanges 106. So long as compartments RC are empty, locking elements 167a will hang down and rest on levers 152a. Levers 152a have notches 178. When these levers are urged downward by operation of cranks 156, locking elements 167a will catch in notches 178 and will prevent levers 152a from moving to the extent necessary to move the ejectors 112a beneath columns P1 as required for a vending operation. However, as soon as packs of cigarettes are dropped into compartments RC, they will drop down on top of flanges 172. This will cause the locking elements to pivot counterclockwise (as viewed in FIG. 2) so as to free levers 152a for full operation.

The transversely extending angle bar 102 shown in FIG. 2 has a plurality of notches so as to accommodate article-retaining members 184, all of which are pivotally supported by a rod 186 secured to the top side of angle bar 102. These pivotally supported members 184 are biased by a spring 187 toward the bottommost pack in the compartment directly in front of it. Each compartment has its own article-retaining member 184. Each time a pack is ejected from one of the compartments RC, it will engage the associated article-retaining member 184. The latter will yield with the pack of cigarettes sufficiently so as to allow the pack to be dumped onto the chute 66. However, when the ejectors are not being operated, these members act to retain the packs in the rear compartments RC so that they may not be accidentally dislodged when the entire machine is tilted forwardly.

Figure 5:
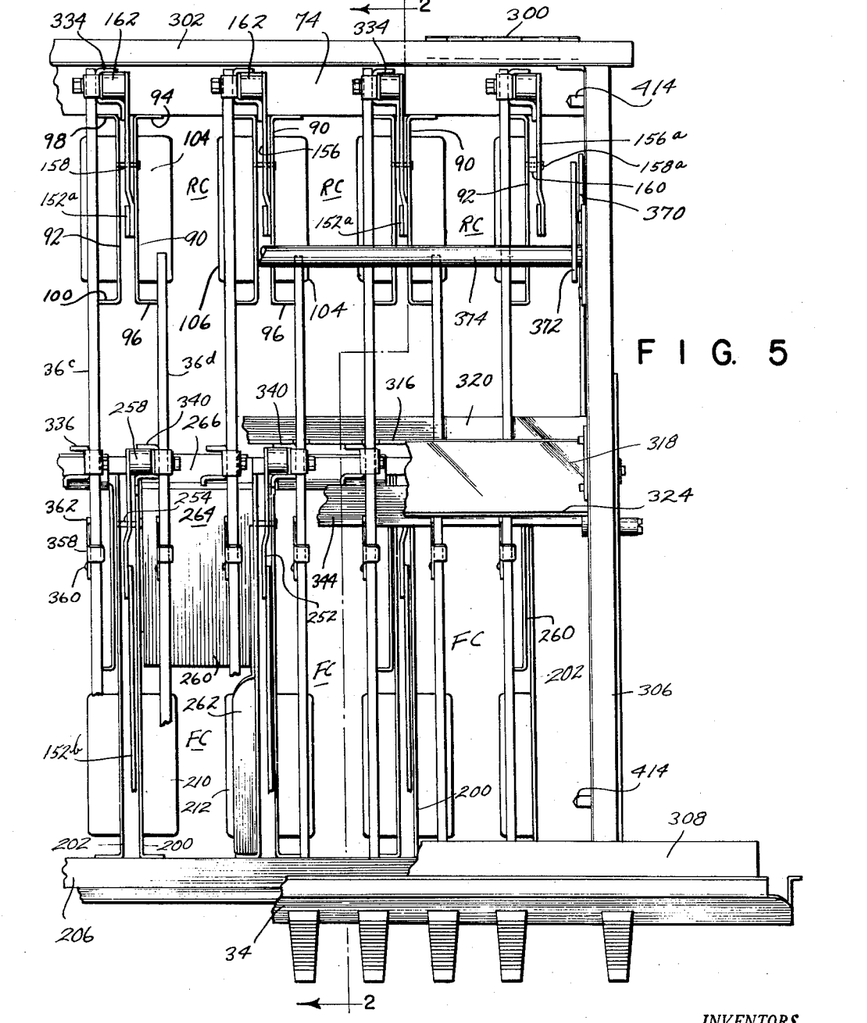
FIG. 5 is a fragmentary plan view of the apparatus shown in FIG. 2, with the cover broken away to show the operating handles and the construction of the storage compartments.

The forward compartments FC are all mounted on the rod 110. Referring to FIGS. 2 and 5, the front compartments FC are dual compartments since they are twice the depth of the rear compartments RC. The front compartments are made up of panels 200 and 202 which have both front and rear flanges. Their front flanges are welded to a transversely extending bar 206. Their rear flanges are welded to a transversely extending structural member 208. These partitions have horizontal package-supporting flanges 210 and 212. These flanges do not extend for the full width of the compartments RC. Instead, they are substantially as long as the corresponding flanges 104 and 106 of the rear compartments RC so as to accommdate a single column P2 of articles.

It is to be noted that the bottom edges of panels 200 and 202 are notched to accommodate a transversely extending angle member 214 and are provided with laterally extending tabs 216 which are welded to the vertical face of angle member 214. Angle member 214 not only holds the different partitions in fixed spaced parallel positions, but it also functions as a supporting floor for an extra column P3 of packs to be stored at the rear of the front compartments FC.

It is believed apparent from the foregoing discussion that the partitions 200 and 202, transverse bars 206 and 208, and angle member 214 form an integral front storage unit. Also forming a part of this integral unit are two side plates 222 and 224 which are welded to the ends of bar 206 and angle member 214. These side plates are strengthened by a transversely extending curved member 226 whose ends are welded to said plates. Side plate 222 and 224 act to pivotally support the entire front storage unit on shaft 110, the ends of the latter extending through the side plates. As mentioned previously, the ends of shaft 110 are secured to side walls 54 and 56.

When the front storage unit comprising the several compartments FC is pivoted forwardly (counterclockwise as viewed in FIG. 2), the rear compartments RC are exposed. In order to prevent the front storage unit from pivoting forward too far, there is provided a chain 230 which is connected at one end to the structural member 208 and at the other end to the angle member 102. Since angle member 102 is fixed to the rear partitions 90 and 92, it effectively anchors chain 230. Hence, the front storage unit may swing forward on shaft 110 to the extent permitted by the length of chain 230. In order to prevent the front storage unit from pivoting too far beyond the vertical when it is swung back toward its normal position, there is provided a pair of fixed inwardly extending pins 232, one on each of the two side walls 54 and 56. Cooperating with these pins is a notch 234 formed in each end flange 236 of structural member 208. The notches are shaped to snugly receive the pins, and the pins are so located as to stop rearward movement of the front storage unit when it is approximately vertical.

The angle member 214 is notched in a manner similar to the rear corresponding angle member 102 so as to carry a series of package-retaining elements 240 which are identical to the rear retaining elements 184. The retaining elements 240 are mounted on a common rod 242 in the same manner that their rear counterparts 184 are mounted on rod 186. Springs 244 (identical to springs 187) urge the members 240 clockwise up against the bottommost pack in the front column P2. The retaining elements 240 yield to permit positive ejection of packs from the front column P1; otherwise, they prevent the packs from falling rearwardly off of flanges 210 and 212 when the machine is tilted rearwardly.

As noted previously, the front panels 200 are provided with the locking elements 167b which are identical to locking elements 167a. These panels 200 also have notches 248 to accommodate the flanges 172 of locking elements 167b. Notches 248 correspond to notches 174 on the rear panels 90. The levers 152b have notches 250 which correspond in shape, location, and function to the notches 178 in levers 152a. At their top ends, the levers 152b are pivotally secured to T-shaped cranks 252. These T-shaped cranks are secured by pins 254 to the partitions 200 and 202 in the same manner as the cranks 156 are secured to the partitions which make up the rear storage compartments RC. At their upper ends, the cranks 252 are provided with rollers 258 which are identical to rollers 162 on cranks 156. Rollers 258 are located at the same level as rollers 162.

Disposed within each of the compartments FC between its two panels 200 and 202 is an auxiliary chute 260. Chutes 260 are all identical. They are L-shaped in cross section but have flanges 262 at their front ends so as to contain therein the column P3 of packs of cigarettes. Along the top edges of their rear portions 264, chutes 260 each have an overhanging lip 266. This overhanging lip is placed over the supporting member 208. The latter member has a flange 268 at its top edge. The lip 266 snaps over flange 268. Secured to the rear side 264 of each chute 260 is a resilient leaf-spring member 274. The bottom end of each leaf-spring member 274 is bent rearwardly so as to form a projecting lip 276. The top ends of springs 274 bear against the front surface of cross member 208, urging the auxiliary chutes 260 to pivot forward about flange 268 to the dotted line position illustrated in FIG. 2. However, so long as the front column of packs P1 is above a predetermined level, i.e., above angle member 214, the front column will prevent the auxiliary chutes 260 from swinging forward into the space occupied by the front columns.

Each crank 252 is pivotally secured to a rod 280 which extends down between partitions 200 and 202 of adjacent compartments. At their bottom ends, rods 280 are bent rearwardly as at 282 and then bent laterally as at 284 so as to extend behind the adjacent compartment. The transversely extending portion 284 of each rod 280 is provided with a pair of wheels 286 (only one is visible in FIG. 2) which ride on the rear flanges of partitions 200 and 202. Secured to each transversely extending portion 284 is a tension spring 290. All of the tension springs 290 are secured at their bottom end to a transversely extending brace member 292 which is welded to the rear flanges of partitions 200 and 202.

It is believed to be apparent from FIG. 2 that when a crank 252 is rotated counterclockwise, the lever 152b associated therewith operates to pivot the associated ejector 112b. At the same time, the rod 280 associated therewith is caused to move upward. On upward movement of rod 280, its rear transversely extending portion 284 rides up under and engages the rearwardly extending portion 276 of spring 274, thereby preventing it and the auxiliary chute 260 attached thereto from pivoting forward into the front section of the associated compartment FC. However, when the supply of packs in the forward part of the compartment making up the column P2 is exhausted below a predetermined level (in this case, the level of the floor formed by angle member 214), the auxiliary chute in question will pivot into the forward compartment after the rod 250 has moved downward again. The purpose of engaging the lip 276 of spring 274 each time an ejector is operated is to hold the associated chute vertical so as to allow the packages in the front column P2 to drop down upon removal of the bottommost pack by the associated ejector 112b. If this were not done, the packs would be held up by the auxiliary chute 260 which would be urged forward by its spring 274. Subsequently, the ejector would fail to remove a package even though there were more than enough packs in the forward section of the front compartments. This would be because the remaining packs would be held up by the auxiliary chute 220.

The cranks 156 and 252 are operated by the handles 36. These handles form part of an assembly which is capable of being disconnected from the cranks.

Turning now to FIGS. 2–6, it is to be noted that the upstanding rear flange of cross member 74 is provided with a hinge 300. This hinge 300 connects a transversely extending member 302 to the cross member 74. This cross member 302 is part of a rectangular frame which carries the operating handles 36. The other elements of the frame are side members 304 and 306, and a front member 308. Panel 34 is secured to front frame member 308.

Handles 36 are not all identical. The two end handles 36a and 36b are special handles. Handle 36a is used to dispense matches from a match dispensing unit generally identified by numeral 312. The mechanism operated by this handle for dispensing the matches may be of any suitable construction. Preferably, the match dispensing unit is of the type illustrated and described in our copending application Serial No. 654,747, filed April 24, 1957, for "Article Dispenser." The handle 36b is employed to operate a coin-return lever on a suitable coin-controlled mechanism (not shown). Preferably, the coin-controlled mechanism is of the kind disclosed in our issued Patent No. 2,726,749, issued December 13, 1955, for "Coin-Controlled Mechanism for Vending Machines."

The remaining handles are of two types, 36c and 36d, and there are arranged alternately. Handles 36c and 36d are substantially the same, the chief difference being their length. Handles 36c are longer and in their normal retracted position they extend back almost as far as rear frame member 302. On the other hand, handles 36d terminate slightly beyond the front flanges 96 and 100 of rear panels 90 and 92. However, handles 36d may be shorter or longer without affecting their usefulness. Handles 36c and 36d pass through slots formed in front frame member 308 and also through slots formed in a vertical wall 316 which is integral with and forms part of a transversely extending structural member 318 which is fastened at its ends to side frame members 304 and 306. Vertical wall 316 is provided at its bottom edge with a horizontal flange 320 which underlies all of the handles 36c and 36d and supports them in a horizontal position in cooperation with the front frame member 308. Structural member 318 also has an upstanding flange 324 at its forward edge.

Handles 36c are provided at their rear ends with U-shaped elements 334 which are sized to receive rollers 162 on cranks 156. Handles 36c also have additional U-shaped elements 336 approximately half way between their ends. U-shaped elements 336 are identical to U-shaped elements 284, except that they are reversed with respect to the latter. Handles 36d have additional U-shaped elements 340 which are identical to U-shaped elements 336 both in configuration and orientation. The U-shaped elements 340 accommodate the rollers 258 on cranks 252. The U-shaped elements 336 do not receive any rollers. However, they serve another function which is also served by the U-shaped elements 340. When the frame which carries the handles 36 is pivoted upward on hinge 300, the U-shaped members 334 and 340 will be disengaged from the rollers 162 and 258. When the frame is pivoted downward to the horizontal position shown in FIG. 2, these U-shaped members will recapture rollers 162 and 258. When handles 36c and 36d are pulled forwardly, U-shaped elements 334 and 340 will cause cranks 156 and 252 respectively to rotate. When these cranks rotate, they operate the ejectors 112a and 112b as previously described.

Figure 3:
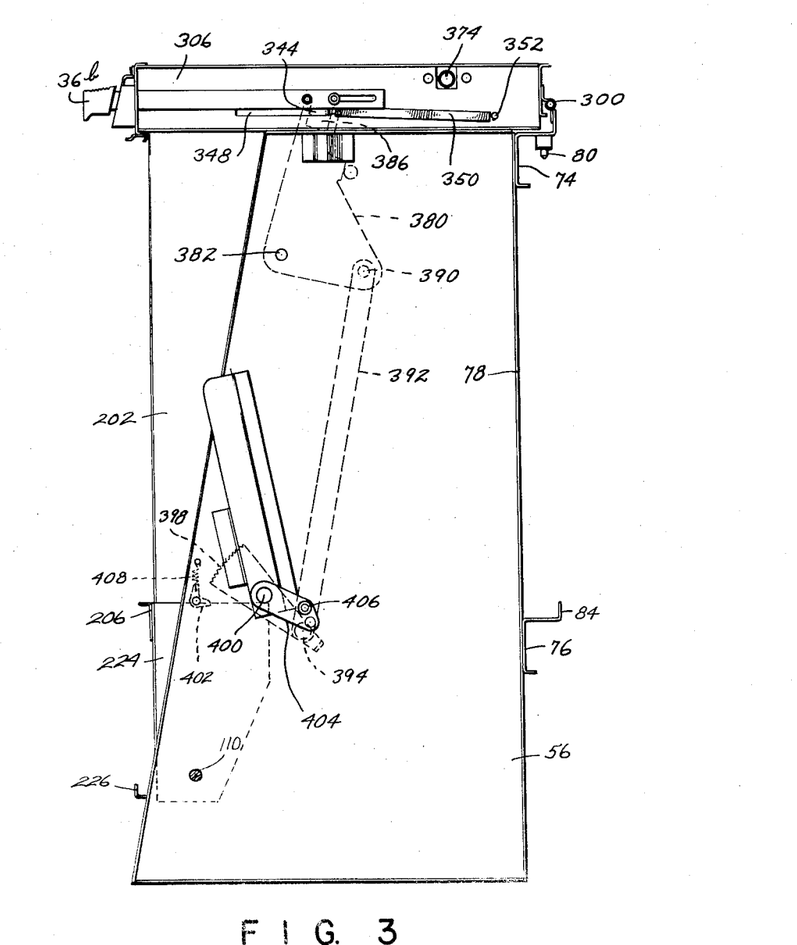
FIG. 3 is a side view in elevation of the assembly which is removably situated in the case shown in FIG. 1 and which comprises the entire operating mechanism and the storage compartments.

It is to be noted that the U-shaped elements 336 and 340 extend down below the handles sufficiently to engage the rear edge of a transversely extending bar 344. The ends of bar 344 are positioned in elongated slots 348 formed in the side frame members 304 and 306. As seen in FIG. 3, the left-hand end of bar 344 has a spring 350 attached thereto. The opposite end of tension spring 350 is anchored to a pin 352 which is secured in the side frame member 306. When the handles 36c and 36d are pulled forward, the U-shaped elements 336 and 340 cause the bar 344 to move forwardly along the slots 348 against the opposition provided by springs 350. Any one of the handles 36c and 36d will cause forward movement of the bar 344. Although the spring 350 will tend to return the bar 344 to its normal rear position (FIG. 3) when a handle 36 is released, it is preferred that means be provided whereby a rearward force manually exerted on any extended handle will cause the bar 344 to return to its normal at-rest position. Accordingly, each of the handles 36c and 36d is provided with a pawl 358 which is pivotally secured thereto by a pin 360. As seen in FIG. 6, each pawl 358 includes an upstanding element 362 which engages the forward flange 324 of structural member 318 when the handles are in their at-rest position. In effect, the upwardly extending flange 324 acts to lift the pawls to the position shown in FIG. 2. However, when one of the handles 36c or 36d is pulled forward so as to move its pawl 358 away from the flange 324, the pawl will drop down in advance of the bar 344. Thereafter, when the handle is pushed rearward again by the operator, pawl 358 will engage the forward edge of bar 344 and will thereby push the bar back to its normal at-rest position. Thus, should spring 350 fail to return the bar to its normal at-rest position, the bar will nevertheless be restored to its position when the operator exerts an inward force on a handle 36 previously pulled out for a vending operation. When the handle in question is pushed in again, its pawl 358 will reengage flange 324 and be forced upward by the latter so as to be free of bar 344. This is important since displaceable segment means (not shown) are provided to prevent operation of more than one handle at a time. Accordingly, it is imperative that when one handle is operated, the pawls 358 of the other locked handles not be hanging down in position to block forward movement of bar 344 by the handle which is being operated.

In order to assure that the bar 344 will be advanced evenly, i.e., continually parallel to the front structural member 308, there is provided adjacent the inner side of each of the structure frame members 304 and 306 a linkage comprising a slidable lever 370 and a crank 372 which is pivotally secured to the rear end of the lever 370. The forward ends of slidable levers 370 are rotatably secured to the ends of bar 344. Both of the cranks 372 are securely attached to a transversely extending shaft 374 which is journaled in the side frame members 304 and 306. Thus, if one end of bar 344 tends to advance faster than the opposite end, it will be prevented from doing so because of the interlocking of the linkages 370, 372 with shaft 374. Hence bar 344 must move evenly.

Bar 344 serves still another function. In this connection, it is to be noted that the outside wall 56 of the assembly has pivotally secured thereto on its inner surface a large pawl 380. Pawl 380 is pivoted at 382. One end of pawl 380 is slotted as shown at 386 so as to form a yoke which receives the adjacent end of bar 344. At a different point 390, pawl 380 is pivotally secured to a lever 392. The bottom end of lever 392 is pivotally secured at 394 to a ratchet lever 398 which is attached to a stub shaft 400. Ratchet lever 398 is engaged by a pawl 402. Shaft 400 is journaled in the side wall 56. Lever 398 is located on the inside face of wall 56. Stub shaft 400 extends through side wall 56 and on its outside end there is affixed a crank arm 404 having at its free end a roller 406. Pawl 402 yields when ratchet lever 398 is rotated counterclockwise by operation of lever 392 and locks the ratchet lever against return movement, except when the lever has first run fully past the pawl in a counterclockwise direction. A spring 408 centers the pawl for proper operation. The function of crank arm 404 is to operate a coin-controlled mechanism of the kind disclosed in our issued Patent No. 2,726,749, issued December 13, 1955, for "Coin-Controlled mechanism for vending machines."

Figure 4:
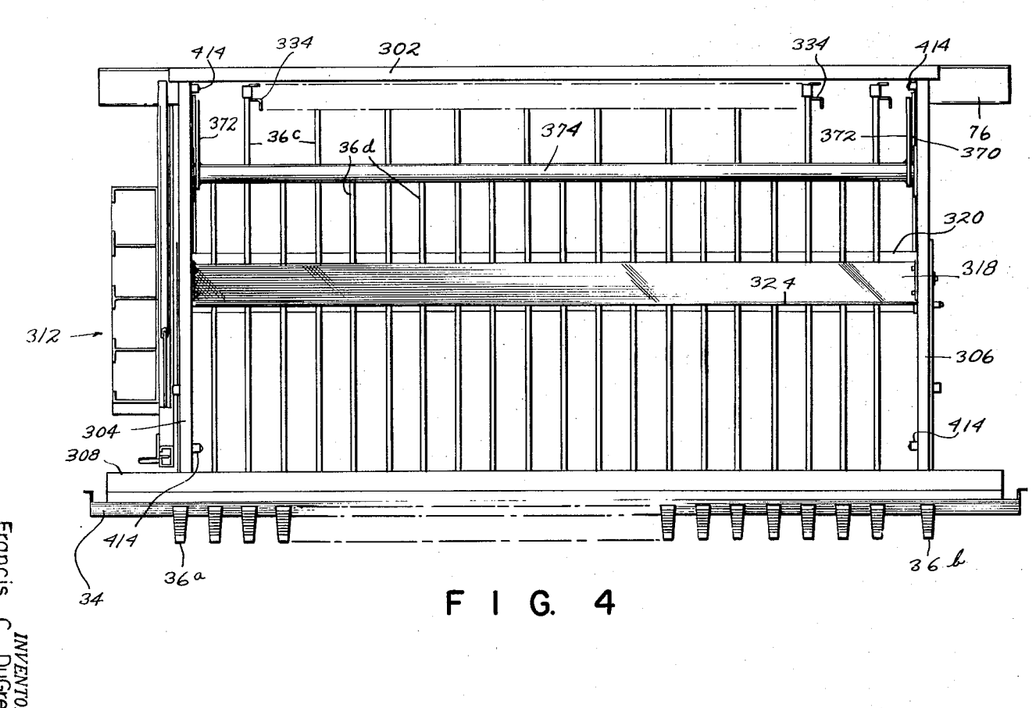
FIG. 4 is a plan view of the assembly shown in FIG. 3.

Returning now to the cover 26, it is to be noted that this cover is provided with four depending tabs 410, one adjacent to each of its corners. Each tab is provided with a hole 412 adjacent its bottom edge to receive pins 414 which are securely fastened to the side frame members 304 and 306. Tabs 410 and pins 414 are best seen in FIGS. 2, 4, and 5. Cover 26 may be secured to the handle assembly frame before the mechanical assembly 52 is positioned within the housing, or afterwards. The cover 26 is simply laid on top of the handle assembly frame and pressed down. When the cover is pressed down, the tabs 410 are forced aside by the pins 414 until the holes 412 come into registration with the pins. As soon as they are in registration, the tabs slip over the pins and thereby lock the cover in place on the frame. Once the cover is secured to the frame, it cannot be removed without bending the tabs aside so as to release them from the pins. Since access to the tabs 410 can be had only when the handle assembly is tilted up, it is believed apparent that removal of the cover cannot be achieved so long as the handle assembly frame is locked down in horizontal position. Means hereinafter described are provided to lock the handle assembly frame in horizontal position.

Referring again to FIG. 2, it is to be noted that the door 16 has an inwardly extending flange 420 formed on the upper edge of the panel 20. At the same time, the front frame member 308 has a horizontal lip 422 which is spaced below horizontal flange 424 which forms part of the panel 34 that is welded to front frame member 308. The flange 420 fits between the horizontal lip 422 and the flange 424 when the door 16 is swung closed after the handle assembly frame with cover 26 attached has been moved down to its normal horizontal position. The top edges of side panels 54 and 56 support the handle assembly frame in its normal horizontal position. Once flange 420 has been located between the lip 422 and flange 424, the cover and handle assembly may not be tilted up without first opening the door 16. Since the door 16 is locked by means of the bars 48a and 48b directly to the case, the only way to release the handle assembly is to unlock the lock 46. Once the door has been unlocked, the handles may be swung up so as to permit loading of the front and rear compartments.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

We claim:

1. A vending machine comprising a first plurality of compartments extending in line across the machine, said compartments each adapted to contain a vertical column of articles to be vended, a second plurality of like compartments extending in line across the machine in back of said first plurality of compartments, an ejector member mounted beneath each of said compartments and operative when actuated to eject the bottom article from the compartment with which it is associated, the ejectors associated with said first plurality of compartments mounted so as to eject articles toward said second plurality of compartments and the ejectors associated with said second plurality of compartments mounted so as to eject articles toward said first plurality of compartments, a chute mounted beneath said compartments for receiving ejected articles and delivering them to the purchaser, operating levers attached to said ejector members, said operating levers extending up outside of the compartments with which they are associated, and a plurality of operating handles horizontally slidably mounted in a frame above said compartments and selectively operable from the top front of the machine, certain of said handles having means for operating the ejector levers associated with said first plurality of compartments and others of said handles having means for operating the ejector levers associated with said second plurality of compartments, and means pivotally securing said frame to said second plurality of compartments whereby said entire frame and said operating handles may be moved upwardly to disengage said handles from said operating levers.

2. A vending machine as defined by claim 1, wherein said first plurality of compartments are pivoted forwardly to expose the front side of said second plurality of compartments.

3. A vending machine as defined by claim 1, wherein the ejector members associated with said first plurality of compartments are mounted on a common shaft.

4. A vending machine as defined by claim 1, wherein the ejector members associated with said second plurality of compartments are mounted on a common shaft.

5. A vending machine as defined by claim 1, further including a horizontal shaft on which said first plurality of compartments is mounted for pivotal movement away from said second plurality of compartments.

References Cited in the file of this patent

UNITED STATES PATENTS

| | | |
|---|---|---|
| 781,026 | Scharff | Jan. 31, 1905 |
| 1,191,377 | Weinstein | July 18, 1916 |
| 1,514,598 | Beean | Nov. 11, 1924 |
| 1,675,510 | Nolan | July 3, 1928 |
| 1,827,312 | Franks | Oct. 13, 1931 |
| 2,073,698 | Kalbitzer | Mar. 16, 1937 |
| 2,399,612 | Auerbach | May 7, 1946 |
| 2,548,916 | Sorensen | Apr. 17, 1951 |
| 2,610,100 | Childers | Sept. 9, 1952 |
| 2,843,242 | Gabrielsen | July 15, 1958 |
| 2,859,849 | Neidig | Nov. 11, 1958 |
| 2,888,166 | Gabrielsen | May 26, 1959 |
| 2,914,215 | Neidig | Nov. 24, 1959 |

FOREIGN PATENTS

| | | |
|---|---|---|
| 111,379 | Australia | Aug. 26, 1940 |